Nov. 27, 1951     A. STEWART     2,576,423
APPARATUS FOR DETERMINING RESONANT FREQUENCIES
Filed Feb. 4, 1947
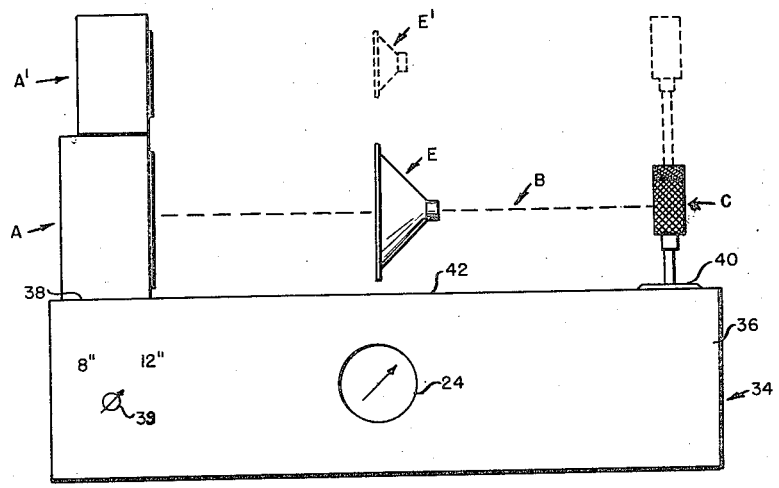
FIG. 1
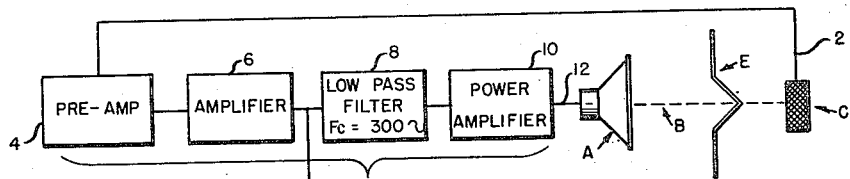
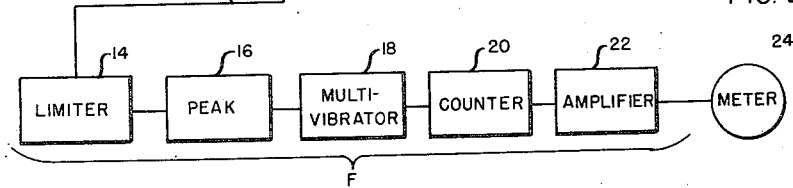
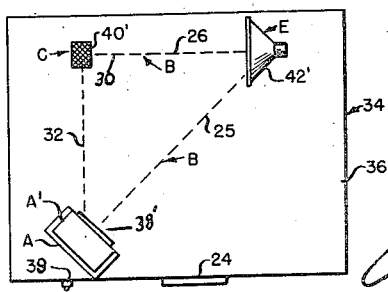
FIG. 3
INVENTOR
ALAN STEWART
BY
ATTORNEY Patented Nov. 27, 1951

2,576,423

UNITED STATES PATENT OFFICE 2,576,423

APPARATUS FOR DETERMINING RESONANT FREQUENCIES

Alan Stewart, Staten Island, N. Y., assignor to General Instrument Corporation, Elizabeth, N. J., a corporation of New Jersey Application February 4, 1947, Serial No. 726,381

6 Claims. (Cl. 73—69)

Practically all objects have as one of their natural characteristics a resonant frequency, and it is often desirable and even necessary that this resonant frequency be precisely known. Such is particularly the case in the manufacture of loud speaker cones and the invention is here described as particularly applied to the testing of such cones, but it will be apparent that the method and apparatus here disclosed are not limited thereto but are capable of being used for the measurement of the mechanical resonant frequency of all types of objects.

In the past loud speaker cones have been tested for their resonant frequencies by being subjected to the sound output of a second loud speaker the frequency of which is variable at will over a spectrum. As the frequency is varied, the cone under test is observed either visually or by feel and it is noted that as the frequency of vibration of the driven loud speaker approaches the resonant frequency of the cone under test, the cone vibrates quite noticeably. However, this vibration starts some time before the true resonant frequency of the cone is reached and continues for some period thereafter and consequently an accurate determination of the resonant frequency is a very difficult matter. Considerable skill on the part of the tester is required before the precise resonant frequency can be determined and this skill can be attained only after considerable experience. This testing method, the method almost exclusively employed heretofore, is therefore seen to be not only exceedingly inefficient and time consuming but it also requires for its successful application the employment of highly skilled individuals as testers. Moreover, the final determination of the resonant frequency of the cone under test is subjective, a matter of judgment on the part of the tester, and consequently two different testers might, and often do, report two different results for the same cone.

It is a primary object of the present invention to provide a method for determining the mechanical resonant frequency of an object which permits the attainment of well nigh instantaneous and highly precise results, which results can be obtained wholly objectively even by unskilled personnel.

It is a further object of the present invention to provide a test stand which can be set up for the carrying out of said method.

For carrying out the method herein described I employ a novel audio oscillator. It is a familiar phenomenon, particularly in loud speaker installations installed in auditoriums or the like for amplifying speech, that if the amplification be increased unduly, or if one or more of the loud speakers be directed toward the microphone, that a self-sustained oscillation occurs and a howl or squeal results, this howl or squeal heretofore having been considered exceedingly undesirable and all efforts having been made to eliminate it. I have discovered that for a given installation the frequency of this howl is relatively constant and is composed primarily of the resonant frequencies of mechanical vibration of the various elements which constitute the acoustic system. In particular, this howl is composed of the resonant frequency of the loud speaker, the resonant frequency of the microphone, and the resonant frequency of the surrounding air chamber.

It is a subsidiary object of the present invention to employ the above-described audio oscillator to determine the mechanical resonant frequency of an object.

To the accomplishment of the foregoing objects and such other objects as may hereinafter appear, the present invention relates to a method for determining the mechanical resonant frequency of an object and to apparatus particularly adapted for carrying out said method as defined in the appended claims and as described in this specification, taken together with the accompanying drawings, in which:

Fig. 1 is an elevational view of one embodiment of testing apparatus;

Fig. 2 is a block diagram schematically illustrating the electrical and acoustical elements involved in this method; and Fig. 3 is a top view of an alternative embodiment of test stand.

The audio amplifier employed in the present method comprises a transducer A having a sound output and an electrical input, a second transducer C having an electrical output and a sound input acoustically linked to the transducer A by the sound path B, and electrical connections generally designated D for connecting the electrical output of the transducer C with the electrical input of the transducer A and for suitably amplifying said electrical output. When the amplification reaches a given degree, which degree varies from installation to installation but which may be easily determined experimentally, a self-sustained oscillation occurs and is evidenced by a quite audible howl or squeal. As has previously been mentioned, it has been experimentally determined that the resultant howl consists of one or more frequencies each of which is the natural resonant frequency of an element in the acoustic system. Thus, in the oscillator as thus far described, the howl will consist of the resonant frequencies of the transducers A and C and the resonant frequency of the acoustic chamber within which they operate.

If now the loud speaker cone to be tested, E, be interposed between the transducers A and C, it has been found that the frequency composition of the howl is modified and that this modification consists of the addition of the natural resonant frequency of the cone E. A means generally designated F may be provided for measuring one or more of the frequencies of the oscillation and through the means F the frequency added to the howl by the interposition of the cone E may be determined, that frequency being identical with the natural resonant frequency of the cone E.

The manner in which oscillation takes place in the above described acoustic-electric system is probably as follows: Ambient noise of various frequencies strikes the transducer C and is transformed into amplified electrical impulses of corresponding frequency which are in turn fed to the transducer A. The magnitude of these amplified impulses is not sufficient to set the transducer A into oscillation in opposition to its mechanical inertia except for that noise frequency which corresponds to its resonant frequency. Upon continued energization, the small vibrations of the transducer A at its resonant frequency are picked up by the transducer C and reamplified, this regenerative action continuing until audible oscillation occurs.

A similar effect probably takes place in the transducer C. That ambient noise frequency corresponding to the natural resonant frequency of the transducer C causes abnormal vibration of the elements of said transducer at that frequency, thus giving rise to an electrical output which when amplified and regenerated attains audible proportions. The air in the acoustic chamber resonates similarly.

When the cone to be tested E is interposed in this audio amplifier, the ambient noise sets it into vibration at its resonant frequency and that vibration picked up by the transducer C and amplified by the means D causes the transducer A to vibrate at the same frequency and thus give rise to the above-described regeneration.

While this is probably the true explanation for the operation of this audio oscillator, I do not wish to be limited to this explanation and the above-described results may be considered as an empirical discovery on my part.

The means F for measuring the frequency of oscillation is here shown as measuring the frequency of the amplified electrical oscillations which constitute the input to the transducer A. However, it will be apparent that any other method of measuring the frequency of oscillation could be employed, whether that method be electrical or acoustical.

It is apparent that the acoustic system thus far described will, when connected for oscillation, produce four separate and distinct frequencies of oscillation corresponding to the natural resonant frequencies of the transducers A and C, the cone E and the air chamber. It is desirable to eliminate insofar as possible all frequencies other than the resonant frequency of the cone E to be tested in order to facilitate the measurement of that frequency. Various acoustical and electrical means well known in the art may be employed to that end and there will herein be described several methods which should be considered as suggestive and not as limiting the scope of the invention.

The electrical connecting and amplifying means D illustrated in Fig. 2 comprises a series of separate circuit elements each of which is of well known and conventional form and consequently is designated in Fig. 2 merely by a suitably labeled block. The electrical output from the transducer C is carried by lead 2 to a preamplifier 4 and then to an amplifier 6. Of course these two amplification stages could optionally be consolidated into one. From there the current travels to a low pass filter 8 the cut off frequency of which is 300 cycles per second. The output of the filter 8 passes to a power amplifier 10 and thence via lead 12 to the electrical input of the transducer A. This composite amplifier is so designed as to have a high gain characteristic the response of which is relatively flat below 300 cycles per second but which falls off rapidly above 300 cycles. The resonant frequency of the transducer C, which is normally composed of small and light elements, is usually far above 300 cycles per second and consequently the regenerative tendency at the resonant frequency of the transducer C is markedly attenuated to a degree such that oscillation at that frequency never occurs.

The composite amplifier D may further be so designed, in a manner well known to the art, that its amplification falls off markedly at very low frequencies, for example, those below 50 cycles per second so that the response of the composite amplifier D is flat only between 50 and 300 cycles per second. Since the resonant frequency of the acoustic chamber is normally below 50 cycles per second, oscillation at that frequency is prevented.

The composite amplifier D may therefore be so designed as to attenuate the resonant frequencies of the acoustic chamber and of the transducer C and thus permit oscillation to occur only at the frequencies of the transducer A and the cone E to be tested. If the resonant frequency of the transducer A is so chosen as to differ to a substantial degree from the expected range of resonant frequency of the various of the cones E to be tested, the frequency measuring means F may be so designed as to measure only in the expected range of resonant frequency of the cone E. In that way, a single direct reading would represent the resonant frequency of the cone E under test.

As illustrated in Fig. 2, the frequency measuring circuit F is of the electronic counter type. The sonusoidal electrical variations in the amplified output from the transducer C are carried by lead 13 to a limiter circuit 14 where they are transformed into rectangular pulses and sent to a peak circuit 16 and a multi-vibrator 18 the output of which is fed into a counter 20 which produces a current which varies with frequency, said current being amplified at 22 and fed to a meter 24 which gives a direct frequency reading on a linear scale. This arrangement is illustrative only and many variations may be made in the details and general arrangement of the frequency measuring circuit F without departing from the scope of this invention. If this circuit be so designed as to measure only frequencies within the expected range of resonant frequency of the various cones E to be tested but not to measure the resonant frequency of the transducer A, the direct reading obtained from the meter 24 will always represent only the resonant frequency which is to be determined.

It is often not feasible to employ a transducer A the natural resonant frequency of which is outside the range required. I therefore disclose a method whereby a suitable acoustical arrangement substantially eliminates oscillation at the resonant frequency of the transducer A so that the resultant howl is composed predominantly only of the resonant frequency of the cone E to be tested. In this method, which is illustrated by the arrangement of the elements of Fig. 3, a transducer A is employed having the directional acoustic output path 25. The cone E to be tested is placed in that acoustic path 25 so that the sound output of the transducer A impinges directly upon the cone E. The cone E itself has a directional sound transmission characteristic, this direction being along the line 26 which extends out through and perpendicular to its open mouth 28. The cone E is so oriented that its acoustic output path 26 makes an angle with the acoustic path 25 of the transducer A, that angle being for example 45°. The transducer C is positioned on the sound output path 26 of the cone E but not on the sound output path 25 of the transducer A and is preferably so positioned with repect to the latter as to receive little if any of the output of the transducer A. Indeed, it is preferable that the transducer C have directional receiving characteristics and that said transducer C be so oriented that its direction of maximum receptivity 30 lies along the sound output path 26. In the preferred arrangement illustrated, the transducer C is so located that a line 32 drawn from itself to the transducer A will make a right angle with the sound output path 26 of the cone E. By this arrangement the acoustically linking sound path B is not a straight line but is reversely bent upon itself so that the portion of the sound output of the transducer A which corresponds to its own resonant frequency will never reach the transducer C or will only reach said transducer after considerable attenuation in the acoustic system as a whole and consequently oscillation will not occur at that frequency. However, that portion of the output of the transducer A which corresponds to the resonant frequency of the cone E will cause that cone to oscillate and the sound output from those oscillations will be directed toward the transducer C there to be picked up, amplified and redirected at the cone E so that regenerative oscillation will occur only at the natural resonant frequency of the cone E.

The electricity-to-sound transducer A is here illustrated as an electrically driven loud speaker but it will be apparent that any form of vibratory device the frequency of vibration of which is determined by the frequency of the electrical input 12 may be substituted in its place. The sound-to-electricity transducer C is here illustrated as a microphone, said microphone being preferably of the velocity type, but it will be apparent that any other device performing the same functions may be substituted therefor.

By employing the method above described it is possible to determine the mechanical resonant frequency of the cone E merely by inserting the cone E between the transducers A and C, or, viewed more broadly, by so positioning the cone E that an acoustic path or link B is defined between the transducers A and C via the cone E, and by suitably amplifying the electrical output of the transducer C and causing it to become the electrical input to the transducer A so that audio oscillation occurs, and then measuring a frequency of said oscillation. When the oscillator is so electrically and acoustically designed as to attenuate and thus prevent oscillation of vibrations at the resonant frequency of all the elements of the acoustic system other than the cone E the resultant oscillation will take place exclusively at the resonant frequency which is to be determined. Any conventional means such as a conventional frequency measuring circuit F may then be employed to give a direct reading of the frequency to be determined.

This method may be conveniently carried out with a test stand generally designated 34, one embodiment of which is illustrated in Fig. 1. The electrical elements D of the audio oscillator are housed within a cabinet 36 and the meter 24 which indicates the output of the frequency measuring circuit F is situated in easily visible position on one face of the cabinet 36. The exterior of the cabinet is provided with three stations, a transmitting station 38, a receiving station 40 and a testing station 42. The electricity-to-sound transducer A is located in the transmitting station 38, the sound-to-electricity transducer C is located in the receiving station 40, and the cone E to be tested is positionable in the testing station 42. These three stations are so spatially related and the transducers A and C are so designed that an acoustic path B is defined from the transducer A to the transducer C via the cone E when the cone is positioned and properly oriented in the testing station 42.

It may be desired to provide a pair of electrically driven loud speakers A and A' arranged one above the other for alternate energization, the selector switch 39 on the exterior of the cabinet 36 controlling that energization. Speaker A may have a diameter of 12 inches and speaker A' may have a diameter of 8 inches, the former thus having a natural resonant frequency of approximately 80 cycles per second and the latter a natural resonant frequency of 150 cycles per second. With this arrangement, the speaker A' may be employed for the measurement of test cones E' having a diameter between 3 and 4 inches while the larger speaker A will ordinarily be employed for measuring the resonant frequencies of cones E of larger diameter. The transducer C may optionally be movable between the solid and broken line position of Fig. 1 if desired to correspond to and be opposite the speaker A or A' in use.

In the arrangement illustrated in Fig. 1, the acoustic path B is a straight line. However, as has been set forth above, it may be desired to so arrange the acoustical elements that the natural resonant frequency of the transducer A is acoustically attenuated, whereby oscillation at that frequency is prevented. The test stand illustrated in Fig. 3 embodies such an arrangement in which the stations 38', 40' and 42' are so spatially related and the directional characteristics of the transducers A and C and the cone E to be tested are so oriented that the acoustic path B from the transducer A to the transducer C via the cone E when in the testing station 42' is not a straight but rather a bent line. With this arrangement the direct reading meter 24 will always indicate the resonant frequency of the cone E.

The cone E to be tested may be positioned and oriented in the testing station 42 or 42' by any suitable mounting means which will permit it to resonate freely. Such a mounting means is not shown in the drawings since it may take any one of a number of conventional forms. Indeed, a speaker mounting means is not necessary in many applications since a testing operator may manually place and orient the cone E in the testing station 42 or 42' and may then almost instantaneously read its natural resonant frequency on the meter 24.

By using the above-described test stand or any other apparatus embodying the method above described, it will be apparent that test cones may be instantaneously tested for their natural resonant frequencies by completely unskilled operators and the frequency determined thereby will be accurate and not dependent in any way upon the skill or judgment of the operator. For mass testing of cones, a single test stand and a single operator can achieve the results obtained by prior art testing methods in a very small fraction of the time of prior art methods and at a tremendous gain in accuracy. The cost of testing and the delay heretofore attendant thereon are reduced to negligible proportions.

While this invention has particular application to the testing of load speaker cones and is described with respect thereto, it is apparent that it can also be applied to the testing of other objects which have natural resonant frequencies of vibration. It is also apparent that many changes may be made in the arrangement and engineering details of the acoustic, electrical and measuring systems here described without departing from the spirit of the invention as defined in the following claims.

I claim:

1. A test stand for determining the mechanical resonant frequency of a loud speaker cone which comprises a transmitting station, a receiving station and a testing station, a first transducer having an electrical input and a sound output in said transmitting station, a second transducer having a sound input and an electrical output in said receiving station, said testing station being for the cone to be tested and being separated from said transducers so that a said cone placed therein is free to vibrate, said stations being so spatially related to one another that an acoustic path may be defined from said first to said second transducer via said cone when said cone is in said testing station, electrical connections including an amplifier between the output of said second transducer and the input of said first transducer, a frequency measuring circuit the input of which is connected to said electrical connections, and an indicating means for said frequency measuring circuit.

2. A test stand for determining the mechanical resonant frequency of a loud speaker cone which comprises a transmitting station, a receiving station and a testing station, a first transducer in said transmitting station having an electrical input, a sound output and a natural resonant frequency, a second transducer in said receiving station having a sound input, an electrical output and a natural resonant frequency, said testing station being for the cone to be tested and being separated from said transducers so that a said cone placed therein is free to vibrate, said stations being so spatially related to one another that an acoustic path may be defined from said first to said second transducer via said cone when said cone is in said testing station, electrical connections including an amplifier between the output of said second transducer and the input of said first transducer, said amplifier being so designed as to amplify frequencies on the order of magnitude of the natural resonant frequency of said second transducer only to a reduced degree, a frequency measuring circuit the input of which is connected to said electrical connections, said frequency measuring circuit being so designed as not to measure the natural resonant frequency of said first transducer, and an indicating means for said frequency measuring circuit.

3. A test stand for determining the mechanical resonant frequency of a loud speaker cone which comprises a transmitting station, a receiving station and a testing station, a first transducer in said transmitting station having an electrical input and a sound output having a directional path, a second transducer in said receiving station having a sound input with a directional characteristic and an electrical output, said testing station being for the cone to be tested, positioned in the sound output path of said first transducer and separated from said transducers so that a said cone placed therein is free to vibrate, said second transducer being so positioned and oriented that its direction of maximum receptivity is more toward said testing station than toward said first transducer, electrical connections including an amplifier between the output of said second transducer and the input of said first transducer, a frequency measuring circuit the input of which is connected to said electrical connections, and an indicating means for said frequency measuring circuit.

4. A test stand for determining the mechanical resonant frequency of a cone which comprises a transmitting station, a receiving station and a testing station, an electrically driven loud speaker having a directional sound output path in said transmitting station, said testing station being for the cone to be tested, positioned in the sound output path of said loud speaker and separated from said loud speaker so that a cone placed therein is free to vibrate, said cone being orientable in said testing station so that the open mouth of said cone is directed toward said loud speaker but makes an angle other than a right angle with the sound output path of said loud speaker, said receiving station being positioned out of the sound output path of said loud speaker but substantially in front of the open mouth of said cone when oriented as above, a microphone having directional characteristics in said receiving station, said microphone being so oriented that its direction of maximum receptivity is more toward said testing station than toward said loud speaker, electrical connections including an amplifier between the output of said microphone and the input of said electrically driven loud speaker, a frequency measuring circuit the input of which is connected to said electrical connections, and an indicating means for said frequency measuring circuit.

5. A test stand for determining the mechanical resonant frequency of loud speaker cones which comprises a transmitting station, a receiving station and a testing station, a pair of selectively energizable first transducers adjacent one another in said transmitting station each having an electrical input and a sound output, a second transducer having a sound input and an electrical output in said receiving station and movable to correspond to the one of said first transducers which is energized, said testing station being for the cone to be tested and being separated from said transducers so that a cone placed therein is free to vibrate, said cone being positionable in said testing station corresponding to the one of said first transducers which is energized, said stations being so spatially related to one another that an acoustic path may be defined from each of said first to said second transducers via said cone when said cone is in said testing station, electrical connections including an amplifier between the output of said second transducer and the input of said first transducers, a switch for selectively connecting the output of said second transducer to the desired one of said first transducers, a frequency measuring circuit the input of which is connected to said electrical connections, and an indicating means for said frequency measuring circuit.

6. A test stand for determining the mechanical resonant frequency of loud speaker cones which comprises a transmitting station, a receiving station and a testing station, a pair of selectively energizable first transducers adjacent one another in said transmitting station, each having an electrical input, a sound output, and different natural resonant frequencies, a second transducer having a sound input, an electrical output, and a natural resonant frequency in said receiving station and movable to correspond to the one of said first transducers which is energized, said testing station being for the cone to be tested and being separated from said transducers so that a cone placed therein is free to vibrate, said cone being positionable in said testing station corresponding to the one of said first transducers which is energized, said stations being so spatially related to one another that an acoustic path may be defined from one of said first to said second transducers via said cone when said cone is in said testing station, electrical connections including an amplifier between the output of said second transducer and the input of said first transducers, said amplifier being so designed as to amplify frequencies on the order of magnitude of the natural resonant frequency of said second transducer only to a reduced degree, a switch for selectively connecting a desired one of said first transducers to the output of said second transducer, a frequency measuring circuit the input of which is connected to said electrical connections, said frequency measuring circuit being so designed as not to measure the natural resonant frequency of said first transducers, and an indicating means for said frequency measuring circuit.

ALAN STEWART.

REFERENCES CITED

The following references are of record in the file of this patent:

UNITED STATES PATENTS

| Number | Name | Date |
| --- | --- | --- |
| 1,832,901 | Harrison | Nov. 24, 1931 |
| 1,990,085 | Mudge | Feb. 5, 1935 |
| 2,009,997 | Germond | Aug. 6, 1935 |
| 2,178,252 | Forster | Oct. 31, 1939 |
| 2,277,037 | Clark et al. | Mar. 24, 1942 |
| 2,283,750 | Mikelson | May 19, 1942 |